(12) United States Patent
Ogasawara

(10) Patent No.: US 12,430,954 B2
(45) Date of Patent: Sep. 30, 2025

(54) INFORMATION PROCESSING DEVICE

(71) Applicant: TOYOTA JIDOSHA KABUSHIKI KAISHA, Toyota (JP)

(72) Inventor: Masahide Ogasawara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/420,951

(22) Filed: Jan. 24, 2024

(65) Prior Publication Data
US 2024/0359659 A1 Oct. 31, 2024

(30) Foreign Application Priority Data
Apr. 28, 2023 (JP) ................. 2023-075111

(51) Int. Cl.
*G07C 5/00* (2006.01)
*B60R 25/10* (2013.01)
*B60R 25/33* (2013.01)

(52) U.S. Cl.
CPC .............. *G07C 5/00* (2013.01); *G07C 5/008* (2013.01); *B60R 25/10* (2013.01); *B60R 25/33* (2013.01); *B60R 2325/20* (2013.01)

(58) Field of Classification Search
CPC ....... B60R 25/10; B60R 25/102; B60R 25/33; G07C 5/00; G07C 5/008; G08G 1/00; G06F 15/16; H04W 4/02; H04W 4/22
See application file for complete search history.

(56) References Cited

U.S. PATENT DOCUMENTS 9,628,975 B1* 4/2017 Watkins ................ H04W 4/027
2019/0137287 A1* 5/2019 Pazhayampallil ... G05D 1/0291

FOREIGN PATENT DOCUMENTS

JP H08-175331 A 7/1996

* cited by examiner

Primary Examiner — Van T Trieu
(74) Attorney, Agent, or Firm — SoraIP, Inc.

(57) ABSTRACT

An information processing device includes a control unit. When the parking position of the user's vehicle is included in a caution-required location where the vehicle is likely to be towed, the control unit executes a process of alerting the user.

3 Claims, 5 Drawing Sheets

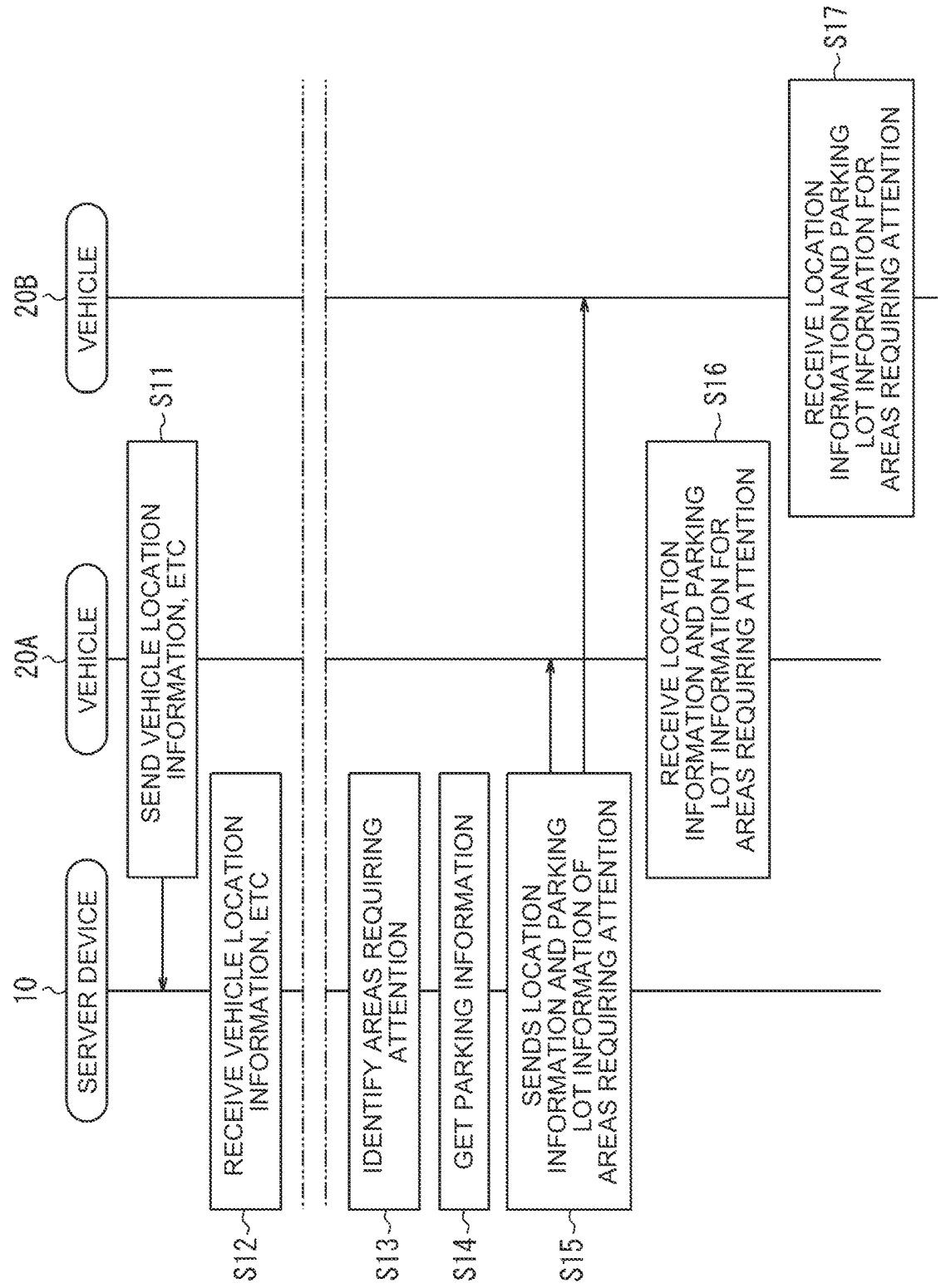

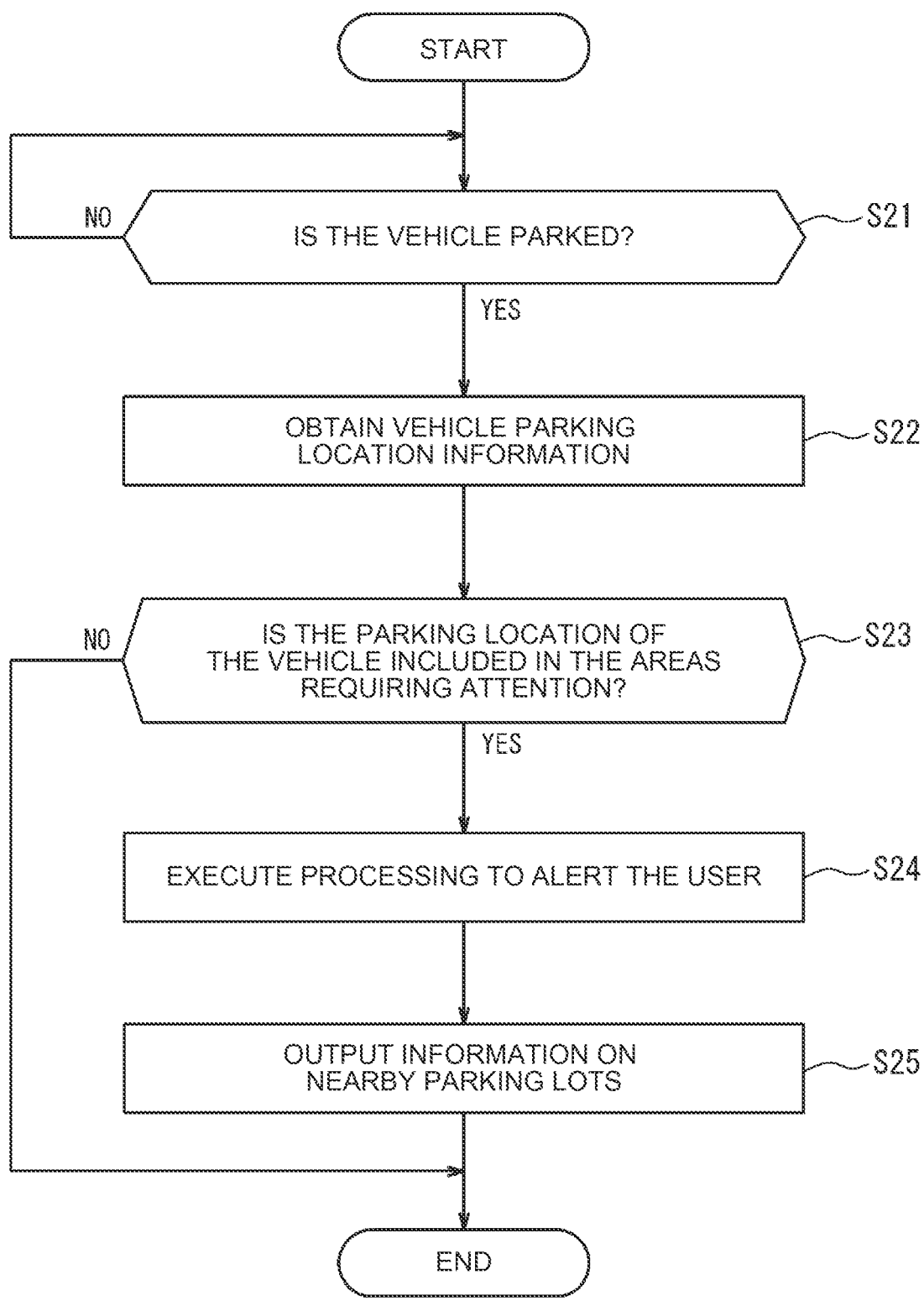

INFORMATION PROCESSING DEVICE

CROSS-REFERENCE TO RELATED APPLICATION

This application claims priority to Japanese Patent Application No. 2023-075111 filed on Apr. 28, 2023, incorporated herein by reference in its entirety.

BACKGROUND

1. Technical Field

The present disclosure relates to an information processing device.

2. Description of Related Art

Conventionally, there is known technology in which, when detecting that a vehicle has been towed, notifies a user that the vehicle has been towed. For example, Japanese Unexamined Patent Application Publication No. 8-175331 (JP 8-175331 A) describes that when determination is made that a vehicle is in an unnatural moving state (e.g., being towed), a command signal is sent to drive means, to cause a horn serving as warning means to operate in accordance with a second form.

SUMMARY

When it is likely that parked vehicles will be towed away, alerting a user in advance would be helpful.

In view of this point, an object of the present disclosure is to alert the user in advance when it is likely that parked vehicles will be towed.

An information processing device according to an embodiment of the present disclosure includes
- a control unit that executes processing to alert a user of a vehicle when a parking position of the vehicle of the user is included in a high-risk location where vehicles are likely to be towed.

According to an embodiment of the present disclosure, when it is likely that parked vehicles will be towed, the user thereof can be alerted in advance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a sequence diagram illustrating an example of a process for specifying a location requiring attention, which is executed by the system illustrated in FIG. 1; and FIG. 5 is a flowchart illustrating an example of an attention-calling process executed by the in-vehicle equipment illustrated in FIG. 1.

DETAILED DESCRIPTION OF EMBODIMENTS

Hereinafter, an embodiment of the present disclosure will be described below with reference to the drawings.

Figure 1:
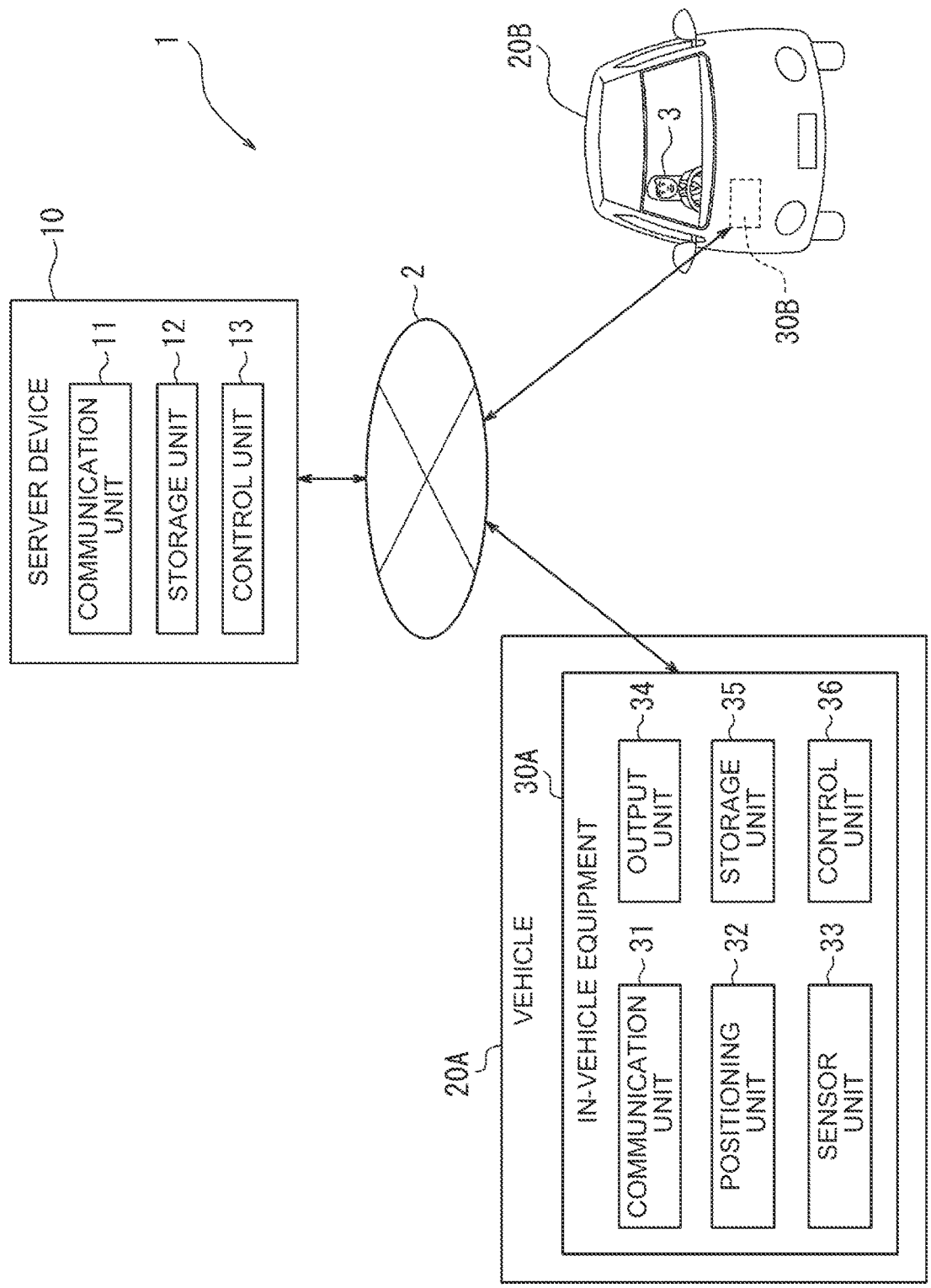
FIG. 1 is a diagram showing a schematic configuration of a system according to an embodiment of the present disclosure.

As shown in FIG. 1, the system 1 according to the present embodiment includes a server device 10, a vehicle 20A, and a vehicle 20B. The vehicle 20A includes in-vehicle equipment 30A. Vehicle 20B includes in-vehicle equipment 30B.

Hereinafter, unless the vehicle 20A and the vehicle 20B are particularly distinguished, they will also be referred to as "vehicle 20." Moreover, when the in-vehicle equipment 30A and the in-vehicle equipment 30B are not particularly distinguished, they are also described as "in-vehicle equipment 30." The system 1 includes two vehicles 20. However, the system 1 may include three or more vehicles 20.

The server device 10 and the in-vehicle equipment 30 can communicate via the network 2. The network 2 may be any network including a mobile communication network, the Internet, and the like.

The server device 10 is an information processing device. The server device 10 is configured to include, for example, one computer or a plurality of computers that can communicate with each other.

The server device 10 identifies a location that requires attention. The caution place is a place where there is a high possibility that the vehicle 20 will be towed away. Here, the vehicle 20 is generally towed away due to a parking violation, vehicle theft, or the like. As will be described later, the server device 10 identifies a location where there is a high possibility that the vehicle 20 will be towed due to factors other than vehicle theft as a cautionary location.

The server device 10 includes a communication unit 11, a storage unit 12, and a control unit 13.

The communication unit 11 is configured to include at least one communication module that can be connected to the network 2. The communication module is, for example, a communication module compatible with standards such as a wired Local Area Network (LAN) or a wireless LAN. The communication unit 11 is connected to the network 2 with the communication module via a wired LAN or a wireless LAN.

The storage unit 12 is configured to include at least one semiconductor memory, at least one magnetic memory, at least one optical memory, or a combination of at least two of them. The storage unit 12 may function as a main storage device, an auxiliary storage device, or a cache memory. The storage unit 12 stores data used for the operation of the server device 10 and data obtained by the operation of the server device 10.

The control unit 13 is configured to include at least one processor, at least one dedicated circuit, or a combination thereof. The processor is, for example, a general-purpose processor such as a Central Processing Unit (CPU) or a Graphics Processing Unit (GPU), or a dedicated processor specialized for specific processing. The control unit 13 executes processing related to the operation of the server device 10 while controlling each part of the server device 10.

Vehicle 20A has an auto alarm function. The auto alarm function is a function that warns with sound or light when an intrusion into the vehicle 20A is detected. For example, the auto alarm function is activated by detecting that the door, trunk, or bonnet of the vehicle 20A is unlocked by a method other than a predetermined operation, or by detecting an intruder into the vehicle 20A using an intrusion sensor. Intrusion into vehicle 20A is detected. The predetermined operation is, for example, an operation using a smart entry or a wireless remote controller.

Vehicle 20B is driven by user 3. Vehicle 20B may have an auto alarm function.

The in-vehicle equipment 30 is an information processing device. The in-vehicle equipment 30 is, for example, a navigation device. The in-vehicle equipment 30 includes a communication unit 31, a positioning unit 32, a sensor unit 33, an output unit 34, a storage unit 35, and a control unit 36.

The communication unit 31 is configured to include at least one communication module that can be connected to the network 2. The communication module is, for example, a communication module compatible with mobile communication standards such as Long Term Evolution (LTE), 4th Generation (4G), or 5th Generation (5G).

The communication unit 31 may include at least one communication module capable of communicating with an Electronic Control Unit (ECU) of the vehicle 20 on which the in-vehicle equipment 30 is mounted. The communication module is, for example, a communication module compatible with in-vehicle network or leased line standards.

The positioning unit 32 is capable of acquiring position information of the vehicle 20 on which the in-vehicle equipment 30 is mounted. The position information of the vehicle 20 is information that allows the position of the vehicle 20 to be specified. The position information of the vehicle 20 is, for example, coordinates. The positioning unit 32 is configured to include at least one receiving module corresponding to the satellite positioning system. The receiving module is, for example, a receiving module compatible with Global Positioning System (GPS).

The sensor unit 33 is capable of detecting the tilt angle of the vehicle 20 on which the in-vehicle equipment 30 is mounted. The sensor unit 33 includes, for example, a G sensor or an acceleration sensor.

The output unit 34 is capable of outputting data. The output unit 34 is configured to include at least one output interface capable of outputting data. The output interface is, for example, a display or a speaker. The display is, for example, a Liquid Crystal Display (LCD) or an organic Electro Luminescence (EL) display.

The configuration of the storage unit 35 may be the same as or similar to the configuration of the storage unit 12. The storage unit 35 stores data used for the operation of the in-vehicle equipment 30 and data obtained by the operation of the in-vehicle equipment 30.

The configuration of the control unit 36 may be the same as or similar to the configuration of the control unit 13. The control unit 36 executes processing related to the operation of the in-vehicle equipment 30 while controlling each part of the in-vehicle equipment 30.

Tow Truck Movement Detection Processing

Figure 2:
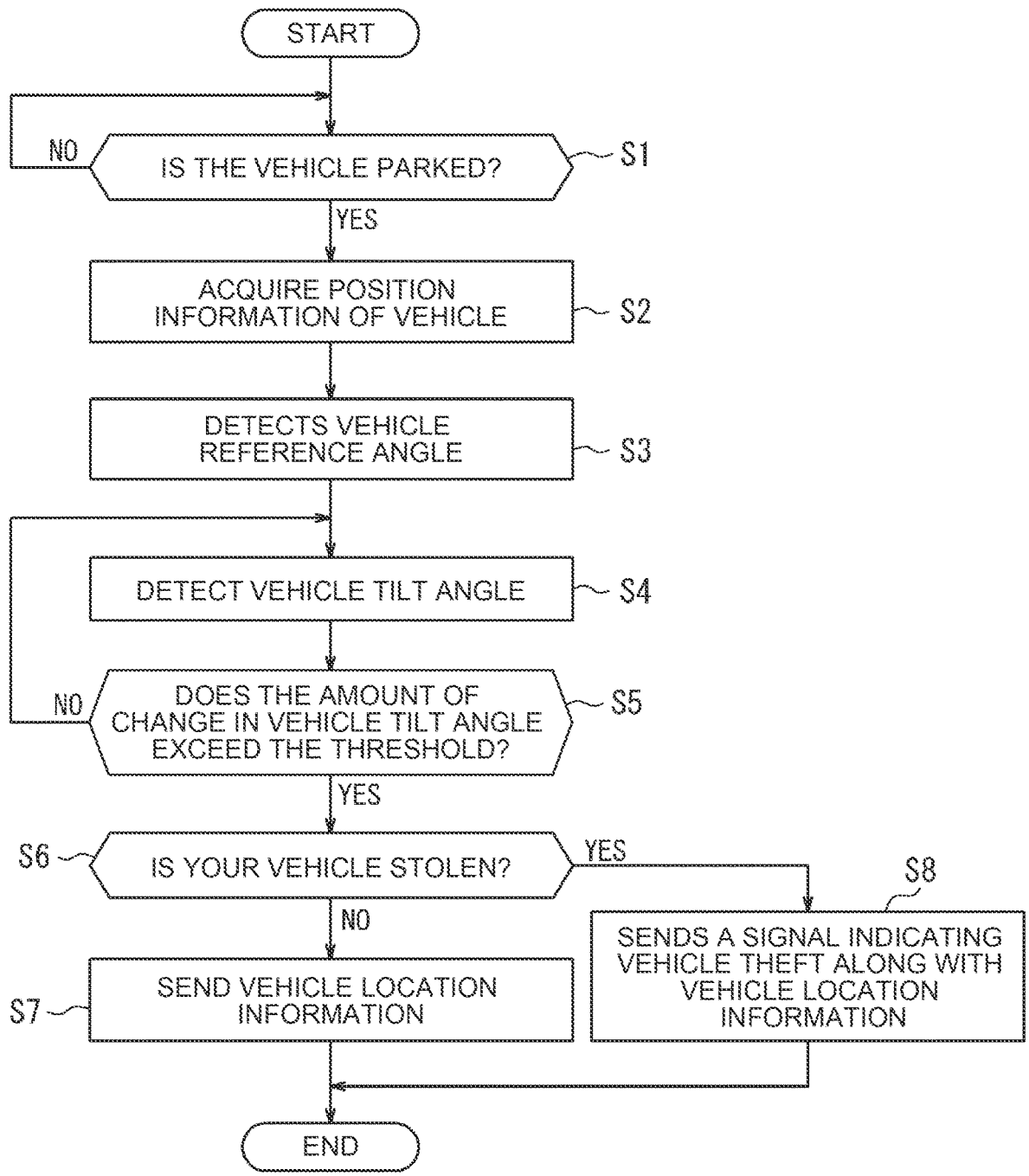
FIG. 2 is a flowchart showing an example of a tow truck movement detection process executed by the in-vehicle equipment shown in FIG. 1.

FIG. 2 is a flowchart showing an example of a tow truck movement detection process executed by the in-vehicle equipment 30A shown in FIG. 1. The control unit 36 of the in-vehicle equipment 30A starts the process of S1 when the vehicle 20A starts traveling. However, the in-vehicle equipment 30 mounted on any vehicle 20 included in the system 1 may execute the towing movement detection process as shown in FIG. 2.

In the process of S1, the control unit 36 determines whether the vehicle 20A is parked. For example, the control unit 36 determines whether the vehicle 20A is parked by communicating with the electronic control unit of the vehicle 20A via the communication unit 31. When the control unit 36 determines that the vehicle 20A is parked (S1: YES), the process proceeds to S2. On the other hand, if the control unit 36 does not determine that the vehicle 20A is parked (S1: NO), it executes the process of S1 again.

In the process of S2, the control unit 36 uses the positioning unit 32 to acquire position information of the vehicle 20A immediately after the vehicle 20A is parked.

In the process of S3, the control unit 36 uses the sensor unit 33 to detect the inclination angle of the vehicle 20A immediately after the vehicle 20A is parked. The control unit 36 sets the detected tilt angle of the vehicle 20A as a reference angle of the vehicle 20A.

Figure 3:
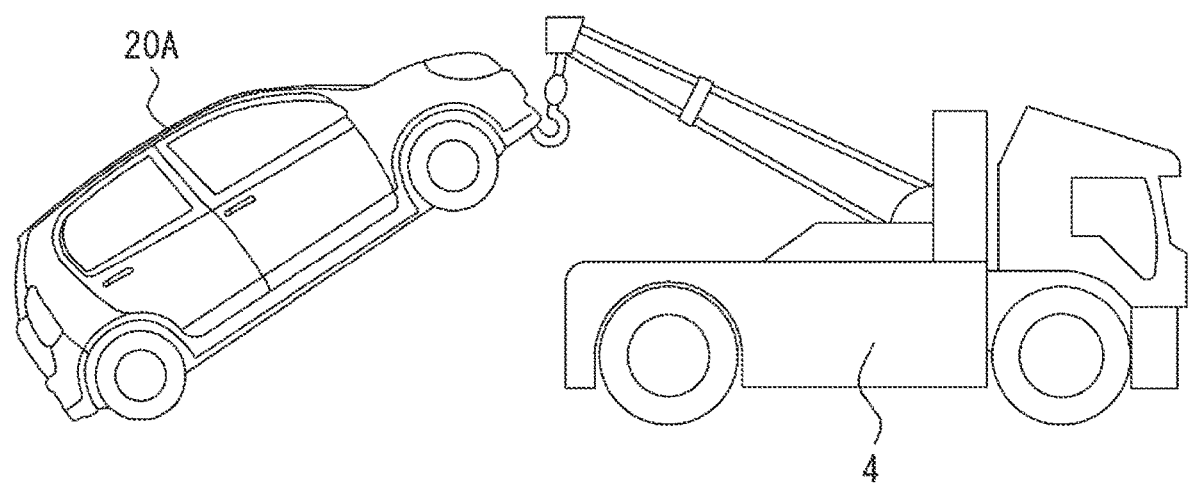
FIG. 3 is a diagram showing how the vehicle shown in FIG. 1 is towed.

In the process of S4, the control unit 36 detects the inclination angle of the vehicle 20A using the sensor unit 33. The control unit 36 calculates the amount of change in the detected tilt angle of the vehicle 20A. The amount of change in the tilt angle of the vehicle 20A is the amount of change in the detected tilt angle of the vehicle 20A from the reference angle of the vehicle 20A. For example, as shown in FIG. 3, when the vehicle 20A is towed by the tow truck 4, the vehicle 20A is first lifted by the crane of the tow truck 4. At this time, the tilt angle of the vehicle 20A changes from the reference angle, which is the tilt angle of the vehicle 20A immediately after the vehicle 20A is parked. Therefore, the control unit 36 calculates the amount of change in the tilt angle of the vehicle 20A.

In the process of S5, the control unit 36 determines whether the amount of change in the tilt angle of the vehicle 20A exceeds a threshold value. The threshold value may be set based on the inclination angle of the vehicle 20A when the vehicle 20A is lifted by the tow truck 4 as shown in FIG. 3. When the control unit 36 determines that the amount of change in the tilt angle of the vehicle 20A exceeds the threshold (S5: YES), the process proceeds to S6. On the other hand, when the control unit 36 determines that the amount of change in the inclination angle of the vehicle 20A is less than or equal to the threshold value (S5: NO), the process returns to S4.

In the process of S6, the control unit 36 determines whether the vehicle 20A is stolen. For example, if an intrusion into the vehicle 20A is detected by the automatic alarm function of the vehicle 20A, the control unit 36 determines that the vehicle 20A is stolen. If the control unit 36 does not determine that the vehicle 20A is stolen (S6: NO), the process proceeds to S7. On the other hand, when the control unit 36 determines that the vehicle 20A is stolen (S6: YES), the process proceeds to S8.

In the process of S7, the control unit 36 transmits the position information of the vehicle 20A acquired in the process of S2 to the server device 10 via the network 2 by the communication unit 31. The positional information of the vehicle 20A acquired in the process of S2 is the positional information of the vehicle 20A immediately after the vehicle 20A is parked, and is the positional information of the vehicle 20A immediately before the towing is started.

In the process of S8, the control unit 36 uses the communication unit 31 to transmit the position information of the vehicle 20A acquired in the process of S2 and a signal indicating vehicle theft to the server device 10 via the network 2.

Identification of Areas Requiring Attention

FIG. 4 is a sequence diagram illustrating an example of a process for specifying a location requiring attention, which is executed by the system 1 illustrated in FIG. 1.

The process in S11 corresponds to the process in S7 or S8. That is, when the control unit 36 of the in-vehicle equipment 30A included in the vehicle 20A executes the process of S7, the communication unit 31 transmits the position information of the vehicle 20A immediately before the start of towing to the server device 10 via the network 2. When the control unit 36 executes the process of S8, the communication unit 31 transmits a signal indicating vehicle theft together with the position information of the vehicle 20A immediately before towing is started to the server device 10 via the network 2.

In the process of S12, the control unit 13 of the server device 10 causes the communication unit 11 to receive the position information of the vehicle 20A from the vehicle 20A via the network 2, or a signal indicating vehicle theft together with the position information of the vehicle 20A. do. The control unit 13 causes the storage unit 12 to store the received position information of the vehicle 20A and the like.

Each time the vehicle 20A or another vehicle 20 is towed, the processes of S11 and S12 are repeatedly executed. By repeatedly executing the processes of S11 and S12, the storage unit 12 of the server device 10 accumulates the position information of the vehicle 20 immediately before the towing starts. The control unit 13 may create a database of this information.

In the process of S13, the control unit 13 of the server device 10 identifies at least one caution-required place based on the position information of the vehicle 20 received in the process of S12. However, when the control unit 13 receives the position information of the vehicle 20 as well as a signal indicating vehicle theft, the control unit 13 does not use the position information of the vehicle 20 to specify the location requiring attention. With such a configuration, it is possible to specify a location requiring attention where the vehicle 20 is likely to be towed due to factors other than vehicle theft. For example, the caution area may be a place where there is a high possibility that the vehicle 20 will be towed away due to a parking violation.

As an example of a process for specifying a place requiring attention, the control unit 13 may specify a place including a predetermined number or more of the positions of the vehicles 20 stored in the storage unit 12 as a place requiring attention. The predetermined number may be set based on the number of pieces of position information of the plurality of vehicles 20 stored in the storage unit 12, or may be set based on the period during which the processes of S11 and S12 are repeatedly executed.

In the process of S14, the control unit 13 acquires information on parking lots around the caution area identified in the process of S13. The parking lot information includes, for example, at least one of a parking lot name and parking lot position information. The location information of the parking lot is information that can specify the location of the parking lot. The position information of the parking lot is, for example, coordinates. The control unit 13 may obtain information on parking lots within a predetermined range from the caution area as information on parking lots around the caution area. The predetermined range may be set in consideration of user convenience. When the control unit 13 identifies a plurality of caution areas in the process of S13, the control unit 13 may acquire information on a plurality of parking lots. The plurality of parking lots is information on parking lots around each of the plurality of caution areas.

In the process of S15, the control unit 13 uses the communication unit 11 to transmit the positional information of the caution place and the information of the parking lot around the caution place to the vehicle 20A and the vehicle 20B via the network 2. The positional information of the cautionary place is information that can specify the position of the cautionary place. The positional information of the location requiring attention is, for example, coordinates. When the control unit 13 identifies a plurality of places requiring attention in the process of S13, the control unit 13 may transmit a list of coordinates indicating position information of the plurality of places requiring attention and information on a plurality of parking lots to the vehicle 20A and the vehicle 20B.

In the process of S16, in the in-vehicle equipment 30A of the vehicle 20A, the control unit 36 receives the position information of at least one caution place and the information of at least one parking lot from the server device 10 via the network 2 by the communication unit 31. That is, the in-vehicle equipment 30A receives position information of at least one caution place and information of at least one parking lot from another device. The control unit 36 causes the storage unit 35 to store the received location information of the caution place and parking lot information.

In the process of S17, in the in-vehicle equipment 30B of the vehicle 20B, the control unit 36 transmits the position information of at least one caution place and the information of at least one parking lot from the server device 10 via the network 2 to the communication unit 31. Receive. That is, the in-vehicle equipment 30B receives position information of at least one caution place and information of at least one parking lot from another device. The control unit 36 causes the storage unit 35 to store the received location information of the caution place and parking lot information.

Here, the processes from S13 to S17 may be executed at predetermined intervals. The predetermined period may be set based on the frequency at which the processes of S11 and S12 are executed or the frequency at which the vehicle 20 included in the system 1 is towed.

Processing to call attention to FIG. 5 is a flowchart showing the flow of attention-calling processing executed by the in-vehicle equipment 30B shown in FIG. 1. The control unit 36 of the in-vehicle equipment 30B starts the process of S21 when the vehicle 20B starts traveling.

In the process of S21, the control unit 36 determines whether the vehicle 20B is parked. For example, the control unit 36 determines whether the vehicle 20B is parked by communicating with the electronic control unit of the vehicle 20B via the communication unit 31. When the control unit 36 determines that the vehicle 20B is parked (S21: YES), the process proceeds to S22. On the other hand, if the control unit 36 does not determine that the vehicle 20B is parked (S21: NO), it executes the process of S21 again.

In the process of S22, the control unit 36 uses the positioning unit 32 to acquire the position information of the vehicle 20B as the parking position information of the vehicle 20B.

In the process of S23, the control unit 36 acquires the positional information of the caution place from the storage unit 35. The control unit 36 determines whether the parking position of the vehicle 20B acquired in the process of S22 is included in the caution area. Here, when the vehicle 20B receives the positional information of the plurality of cautionary places from the server device 10 in S17 described above, the storage unit 35 stores the positional information of the plurality of cautionary places. In this case, the control unit 36 determines whether the parking position of the vehicle 20B that is acquired in the process of S22 is included in any of the plurality of caution areas.

When the control unit 36 determines that the parking position of the vehicle 20B is included in the caution area (S23: YES), the process proceeds to S24. On the other hand, when the control unit 36 does not determine that the parking position of the vehicle 20B is included in the caution area (S23: NO), the control unit 36 ends the attention calling process shown in FIG. 5.

In the process of S24, the control unit 36 executes a process to alert the user. As an example of this process, the control unit 36 causes the output unit 34 to output a notification indicating that the parking position of the vehicle 20B is likely to be towed. The control unit 36 may display this notification on the display of the output unit 34, or may output this notification as audio from the speaker of the output unit 34. As another example of this process, the control unit 36 sends a notification to the terminal device of the user 3 via the network 2 to the communication unit indicating that the parking position of the vehicle 20B is likely to be towed. It may also be transmitted by 31. When the terminal device of user 3 receives this notification, it may display this notification on the display of the terminal device.

In the process of S25, the control unit 36 acquires parking lot information from the storage unit 35. The control unit 36 causes the output unit 34 to output information on parking lots around the parking position of the vehicle 20B among the acquired parking lot information. As an example, the control unit 36 causes the display of the output unit 34 to display the positions of parking lots around the parking position of the vehicle 20B. The control unit 36 may transmit information on parking lots around the parking position of the vehicle 20B to the terminal device of the user 3 via the network 2 using the communication unit 31. When the terminal device of the user 3 receives the parking lot information, it may display the parking lot information on the display of the terminal device.

Here, the process of S23 may be executed by the server device 10. In this case, in the process of S22, the control unit 36 of the in-vehicle equipment 30B transmits the parking position information of the vehicle 20B to the server device 10 via the network 2 by the communication unit 31. The control unit 13 of the server device 10 receives parking position information of the vehicle 20B from the vehicle 20B via the network 2 through the communication unit 11. The control unit 13 determines whether the received parking position information of the vehicle 20B is included in the caution area identified in the process of S13 (S23). When the control unit 13 determines that the parking position of the vehicle 20B is included in the caution area (S23: YES), it executes a process of alerting the user. As an example of this process, the control unit 13 transmits a notification indicating that the parking position of the vehicle 20B is likely to be towed to the in-vehicle equipment 30B or the terminal device of the user 3 via the network 2. communication unit 11. The control unit 13 may transmit information on parking lots around the parking position of the vehicle 20B to the in-vehicle equipment 30B or the terminal device of the user 3 along with this notification. When the in-vehicle equipment 30B receives this notification and/or parking lot information from the server device 10, it may output the received notification and/or parking lot information from the output unit 34, as described above. When the terminal device of the user 3 receives this notification and/or the parking lot information from the server device 10, the terminal device of the user 3 may display the received notification and/or the parking lot information on the display of the terminal device.

In this way, the control unit 36 of the in-vehicle equipment 30B or the control unit 13 of the server device 10 according to the present embodiment alerts the user 3 when the parking position of the vehicle 20B of the user 3 is included in the caution area. Execute processing. With such a configuration, if there is a high possibility that the parked vehicle 20B will be towed away, the user 3 can be alerted in advance. Thereby, the user 3 can move the vehicle 20B before the vehicle 20B is towed away.

Furthermore, in the present embodiment, when the control unit 13 of the server device 10 receives a signal indicating vehicle theft together with the position information of the vehicle 20, the control unit 13 of the server device 10 does not need to use this position information of the vehicle 20 to identify a place requiring attention. With such a configuration, it is possible to specify a location requiring attention where the vehicle 20 is likely to be towed due to factors other than vehicle theft.

Further, in the present embodiment, the control unit 36 of the in-vehicle equipment 30B may cause the output unit 34 to output information on parking lots around the parking position of the vehicle 20B of the user 3. With such a configuration, the user 3 can quickly grasp nearby parking lots and move the vehicle 20B to the parking lots.

Although the present disclosure has been described above based on the drawings and the embodiments, it should be noted that those skilled in the art may make various modifications and alterations thereto based on the present disclosure. It should be noted, therefore, that these modifications and alterations are within the scope of the present disclosure. For example, the functions included in the configurations, steps, etc. can be rearranged so as not to be logically inconsistent, and a plurality of configurations, steps, etc. can be combined into one or divided.

What is claimed is:

1. An information processing device, comprising
   a control unit that executes processing to alert a user of a vehicle when a parking position of the vehicle of the user is included in a high-risk location where there is a high possibility that vehicles are towed away; and
   a communication unit, wherein the control unit identifies the high-risk location by receiving, from a towed vehicle, position information of the vehicle immediately before the towing is started, by the communication unit,
   wherein, when the communication unit receives, from the towed vehicle, a signal indicating vehicle theft along with the position information of the vehicle, the control unit does not use the position information of the vehicle to identify the high-risk location.

2. The information processing device according to claim 1, further comprising an output unit, wherein the control unit causes the output unit to output information regarding parking lots in a vicinity of the parking position of the vehicle of the user.

3. The information processing device according to claim 1, wherein
   the information processing device is in-vehicle equipment of the vehicle of the user, and
   the control unit receives position information of the high-risk location from another device by the communication unit.

* * * * *